(12) United States Patent
Golas

(10) Patent No.: US 8,988,486 B2
(45) Date of Patent: *Mar. 24, 2015

(54) ADAPTIVE VIDEO COMMUNICATION CHANNEL

(71) Applicant: Insors Integrated Communications, Chicago, IL (US)

(72) Inventor: Christopher Golas, Hamton Falls, NH (US)

(73) Assignee: Insors Integrated Communications, Chicago, IL (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/924,086

(22) Filed: Jun. 21, 2013

(65) Prior Publication Data

US 2013/0286156 A1    Oct. 31, 2013

Related U.S. Application Data

(63) Continuation of application No. 12/650,230, filed on Dec. 30, 2009, now Pat. No. 8,471,890.

(51) Int. Cl.
*H04N 7/15* (2006.01)
*H04L 29/06* (2006.01)
*H04L 12/18* (2006.01)
*G06Q 50/00* (2012.01)

(52) U.S. Cl.
CPC .............. *H04N 7/15* (2013.01); *H04L 65/607* (2013.01); *H04L 12/1818* (2013.01); *G06Q 50/01* (2013.01)
USPC ........ 348/14.08; 370/252; 370/270; 370/352; 370/392; 370/469; 375/240.12; 382/239; 455/432.3; 705/14.25; 707/693; 709/203; 709/224; 725/34; 725/91; 725/107

(58) Field of Classification Search
CPC .. H04N 7/15; H04L 12/1813; H04L 12/1818; H04L 65/607; G06F 15/16; G06Q 10/00
USPC .............. 348/14.08; 370/329, 252, 254, 270, 370/312, 352, 390, 392, 469; 375/240.12; 382/239; 455/432.3; 705/14.25; 707/693; 709/203, 224; 725/34, 91, 725/107

See application file for complete search history.

(56) References Cited

U.S. PATENT DOCUMENTS

| | | | |
|---|---|---|---|
| 5,666,293 A | | 9/1997 | Metz et al. |
| 5,687,167 A | * | 11/1997 | Bertin et al. .................. 370/254 |
| 5,768,539 A | | 6/1998 | Metz et al. |

(Continued)

*Primary Examiner* — Gerald Gauthier
(74) *Attorney, Agent, or Firm* — Greer, Burns & Crain, Ltd.

(57) ABSTRACT

A videoconference system includes a plurality of computers associated with the system to collectively send and receive video data streams. A video encoding program is stored in a memory and is executable by at least a first computer. When executed, the executing computer encodes video data using one or more encoding parameters. A decode information set request monitoring program is stored in a memory and is executable by at least the first computer, causing the first computer to perform the steps of monitoring the network for receipt of a decode information set request message and responding to the received request message by querying the received message for an ID and, if the ID of the received message corresponds to a video data stream generated from the first computer, communicating the corresponding decode information set including the encoding parameters to at least a computer that transmitted the message.

19 Claims, 5 Drawing Sheets

(56) References Cited

U.S. PATENT DOCUMENTS

| | | | |
|---|---|---|---|
| 6,147,992 A * | 11/2000 | Giroir et al. | 370/390 |
| 6,826,173 B1 * | 11/2004 | Kung et al. | 370/352 |
| 6,836,478 B1 * | 12/2004 | Huang et al. | 370/352 |
| 7,072,653 B1 * | 7/2006 | Sladek et al. | 455/432.3 |
| 7,180,889 B1 * | 2/2007 | Kung et al. | 370/352 |
| 7,430,187 B2 | 9/2008 | Holt et al. | |
| 7,545,788 B2 | 6/2009 | Anschutz et al. | |
| 7,594,251 B2 * | 9/2009 | Kwon | 725/107 |
| 7,656,824 B2 | 2/2010 | Wang et al. | |
| 7,684,432 B2 | 3/2010 | Adamczyk et al. | |
| 7,739,386 B2 | 6/2010 | Adamczyk et al. | |
| 7,808,993 B2 * | 10/2010 | Zwiebel et al. | 370/392 |
| 7,822,065 B2 * | 10/2010 | Lu | 370/469 |
| 7,984,152 B2 | 7/2011 | Anschutz et al. | |
| 8,027,335 B2 * | 9/2011 | Ansari et al. | 370/353 |
| 8,089,986 B2 | 1/2012 | Adamczyk et al. | |
| 8,139,099 B2 | 3/2012 | Nelson | |
| 8,189,030 B2 | 5/2012 | Ivashin et al. | |
| 8,189,665 B2 * | 5/2012 | Morimoto et al. | 375/240.12 |
| 8,203,592 B2 | 6/2012 | Nelson et al. | |
| 8,214,338 B1 * | 7/2012 | Kirchhoff et al. | 707/693 |
| 8,471,890 B1 * | 6/2013 | Golas | 348/14.08 |
| 8,483,141 B2 * | 7/2013 | Malkamaki et al. | 370/329 |
| 8,542,621 B2 * | 9/2013 | Park | 370/312 |
| 2007/0256096 A1 * | 11/2007 | Wilhelm | 725/34 |
| 2008/0158337 A1 | 7/2008 | Richardson | |
| 2008/0192646 A1 * | 8/2008 | Song et al. | 370/252 |
| 2008/0222283 A1 * | 9/2008 | Ertugrul et al. | 709/224 |
| 2009/0157421 A1 | 6/2009 | Price | |
| 2009/0157869 A1 * | 6/2009 | Cleary | 709/224 |
| 2009/0290698 A1 | 11/2009 | Lundgren et al. | |
| 2010/0077438 A1 * | 3/2010 | Ansari | 725/91 |
| 2010/0086225 A1 | 4/2010 | Yachida | 382/239 |
| 2010/0169482 A1 * | 7/2010 | Tang et al. | 709/224 |
| 2010/0268589 A1 * | 10/2010 | Wesby | 705/14.25 |
| 2010/0281110 A1 * | 11/2010 | Phillips | 709/203 |
| 2013/0286156 A1 * | 10/2013 | Golas | 348/14.08 |
| 2014/0126429 A1 * | 5/2014 | Kung et al. | 370/270 |

* cited by examiner

ADAPTIVE VIDEO COMMUNICATION CHANNEL

This is a Continuation of application Ser. No. 12/650,230, filed Dec. 30, 2009.

FIELD

A field of the invention is videoconferencing. Example applications of the invention include encoding and decoding streaming video during a videoconference.

BACKGROUND

When decoding video data, it is often necessary to obtain video parameters such as bit rate, resolution, and the like. Without this information, it may not be possible to accurately decode the video data, and a user thus may be unable to view the video. Accordingly, it is also often necessary for an encoded video stream to include this information, which may be provided in a so-called key frame, that allows a viewer to decode the video. Often, an encoded video includes a single key frame at the start of the video.

Key frames or other messages including decoding information are significantly larger than other compressed video frames due to the amount and type of information they contain. In some prior art applications, key frames may be sent on a random or periodic basis. This results in frequent transmission of key frames or other similar information sets, which can lead to disadvantageous increases in bandwidth required to provide streaming video. Accordingly, to reduce the required bandwidth, some prior art applications may significantly limit the transmission of key frames or other decode information. For example, a key frame for a streaming video may be transmitted only once per period, with some periods being 20 seconds or more. As a result, new viewers may wait up to 20 seconds before the video data can be decoded and displayed. The delay in video display leads to a lower viewer quality experience and may lead a user to believe a connection is incorrectly established or that there is a software or hardware problem with the videoconferencing equipment.

These and other problems may be particularly acute in videoconferences, and particularly in large scale videoconferences where numerous users are sending audio and video data to one another in real time. Such conferences can require large bandwidth capacity and there may be a premium placed on reducing periodic key frame transmission to conserve the same. Viewer experience is often highly valued in such applications, however, with the result that delays in new user join time are troublesome.

SUMMARY OF THE INVENTION

An embodiment of the invention is a videoconference system that includes a user camera at each of a plurality of user locations, a user computer at each of the plurality of user locations linked to the user camera at each location, and one or more bridges linking the plurality of user computers to one another. A videoconference client program product of the videoconference system is made up of executable instructions stored in a non-volatile computer-readable medium on each of the user computers and causing each of the user computers to communicate a video data stream to each of the other user computers over the one or more bridges wherein each user computer receives a video data stream from each other user computer. Additionally, a video encoding computer program product has executable instructions stored in a non-volatile computer-readable medium on each of the user computers and causing each of the user computers to encode video data received from the camera at the user location. A decode information set request monitoring program product has executable instructions stored in a non-volatile computer-readable medium on at least a first of the user computers and causing the at least one of the user computers to perform the steps of monitoring the network for reception of a decode information set request message, and responding to the decode information set request message by querying the decode information set request message for an ID. If the ID of the decode information set request message matches an ID corresponding to a video data stream generated from the first user computer, communicating a decode information set to at least a second user computer.

Another embodiment of the invention is directed to a method for joining an existing videoconference having a plurality of existing participants, the method performed by a computer, the method comprising the steps of: establishing a connection to a conference bridge over which the plurality of existing participants are communicating a plurality of real time audio and video data streams with one another; receiving a plurality of discrete video streams from the bridge in a first protocol, each of the streams including a unique identifier and originating from one of the existing participants; querying a memory and determining that no decode information set is stored therein for at least a first of the plurality of received video streams and substantially instantaneously communicating a decode information set request in a second protocol that is different from the first protocol, the decode information set request including the unique identifier for the first video stream; receiving a decode information set communicated from the existing participant that is originating at least the first video stream in response to the decode information set request; and, using information from the decode information set to process the at least a first video stream wherein the first video stream is processed and may be displayed upon joining the videoconference.

Still another embodiment of the invention is a videoconference computer program product that facilitates rapid joining of a new user to an existing conference, the program product comprising computer-executable instructions stored on a non-volatile computer-readable medium, when executed the program causes: a first computer to receive a plurality of video streams originated from a plurality of other computers including at least a second computer in a transport protocol, each of the streams having an identifier indicating an originator of the stream; the first computer to query a memory and to determine that no decode information set is stored therein for a first of the plurality of video data streams; the first computer to communicate a decode information set request to the second computer that originated the first video data stream substantially instantaneously after first receiving the first video data stream, the decode information set request communicated using a control protocol associated with the transport protocol; the second computer to monitor a port associated with the control protocol and to receive the decode information set request after its communication from the first computer; the second computer to communicate a decode information set corresponding to the first video data stream to the first computer following reception of the decode information set request; and, the first computer to receive the decode information set and use it to process the at least one video data stream wherein the at least one video data stream may be displayed on a display linked to the first computer with the first reception of the at least one video data stream by the first computer.

DETAILED DESCRIPTION OF THE EMBODIMENTS

Figure 1:
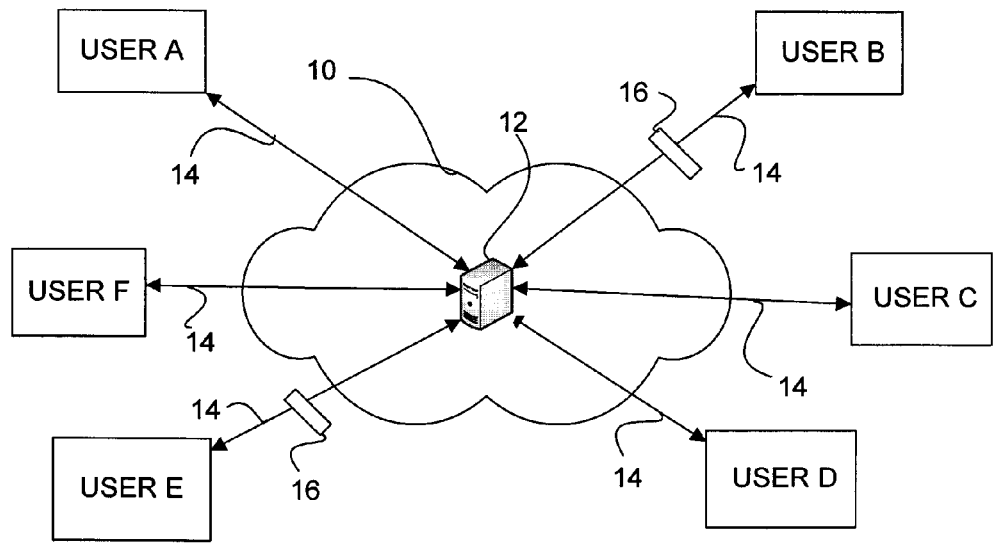
FIG. 1 is a schematic of a network useful to illustrate practice of some embodiments of the present invention.

Before discussing particular features of example embodiments of the present invention in detail, it will be appreciated that the present invention may be embodied in a method, system, and/or a computer program product. For example, a method according to one embodiment may be carried out by one or more users using computers, or by one or more computers executing steps of the invention, and a program product of the system may include computer executable instructions stored on a tangible medium (with examples including, but not limited to, non-volatile memory, magnetic memory, optical memory, electrochemical memory, and the like) that, when executed by one or more computers, cause one or more computers to carry out the steps of a method of the present invention. The program product of embodiments of the invention may be stored on one or more computer-readable storage media (including, but not limited to, a random access memory, a read only memory, an optical disk, a hard disk, a magneto-optical disk, or other non-volatile storage media), and may cause results of computations to be stored in one or more storage media and/or to be displayed on a display device such as a monitor, output over an audio device such as a speaker, and otherwise stored and output in manners that involve a transformation of an electrical and or digital signal to cause a physical transformation of matter to occur.

Further, one or more computers, alone or in combination with connected hardware such as one or more cameras, microphones, monitors, projectors, and the like, that are carrying out step of a method of the invention and/or that are running a program product of the invention may embody a system of the invention. It will therefore be understood that when describing a method of the invention, a system and/or a program product of the system may likewise be described, and vice-versa. It will also be appreciated that various computer program product embodiments of the invention may cause physical changes to occur, and to result in a physical transformation of data and signals to cause a tangible result. As examples, tangible memory devices may be physically altered to store or retrieve data; electronic or other data may be converted to cause speakers to produce sounds and to cause monitors or projectors to output light or otherwise alter the physical state of a display device so that images are displayed. In considering the below description, many additional tangible results and physical changes that occur through operation of program products of the invention will be appreciated.

Embodiments of the invention will now be discussed with respect to the drawings. The drawings include schematic figures that are not to scale, which will be fully understood by skilled artisans with reference to the accompanying description. Features of the drawings may be exaggerated for purposes of illustration. From the embodiments, artisans will recognize additional features and broader aspects of the invention.

FIG. 1 is a schematic of a network 10 that is useful to describe example methods, program products, and systems of the present invention. The network, shown as cloud 10, includes one or more computers 12 that link Users A-F to one another. The term "computer" as used herein is intended to be broadly interpreted as at least one electronic device that accepts, processes, stores, and outputs data according to programmed instructions. Thus, a computer can include, by way of example and not by way of limitation, a laptop computer, mainframe computer, cell phone, personal digital assistant, and any other processor-based controller on a machine The computer 12 may also include, for example, one or more components for linking communications between users. It may include, for example, one or more processor-based devices linked to one another for communications and each having a plurality of communications ports, a software component running one or more storage devices that facilitate communications, one or more network interface cards, one or more modems, and the like.

The computer 12 can be referred to in the video/audio conferencing and networking arts as a conference server, hub, "bridge" (or containing a bridge), or the like which can be, for example, a software component running on a server or router that controls one or more ports for interconnecting Users A-F. As used herein, the term "port" is intended to be broadly interpreted as a physical or logical destination and/or origination point for digital communications. Examples of ports include, but are not limited to network interface cards, IP addresses, TCP or UDP ports numbers, and the like. A bridge may also include software useful to, for example, specify one or more ports for communication between users. Further, although only one computer 12 has been shown, others may be provided. A plurality of computers 12 can be referred to collectively as a conference server group.

The network 10 may be a digital or analog communications network, with a packet switched protocol network being one nonlimiting example. A particular example includes a plurality of computers electronically linked to one another and communicating data to one another in internet protocol (IP) format. The network 10 may be a physically wired network, a wireless network, or some combination thereof. The network 10 may be or include the Internet, a private network, a public network, a virtual private network, a Local Area Network (LAN), a Wide Area Network (WAN), or, of course, a successor to the current Internet (e.g., the Fast Internet, of Grid, currently under development by the European Centre for Nuclear Research (CERN) based in Geneva, Switzerland). The CERN Fast Internet is expected by some to transmit data orders of magnitude faster than what is currently understood to be broadband speed. The Fast Internet and other successor to the Internet are referred to herein simply as fast versions of the Internet.

The protocol between the computer 12 and the Users A-F may be that of server and client. The server-client relationship between the computer 12 and the Users A-F may be reversed on occasion, wherein for some tasks the computer 12 is the client and the User A-F the server, and vice-versa for other tasks.

The network 10 may be useful for a number of data communications purposes. In an example application, the network 10 is useful to facilitate a real-time communications session, such as a video or audio conference between two or more of the Users A-F. Examples of a video communications session include a videoconference wherein two or more of the Users A-F share streaming video and/or audio communications in real-time with one another.

As used herein, the term "real-time" is intended to broadly refer to a condition of generally corresponding to actual time. For example, data can be real-time if it takes about one minute of data playback to describe an event that took about one minute to occur. Real-time data may be, but is not necessarily, "live" data that is generated and communicated substantially contemporaneously with minimal delay or such that the delay is not obtrusive with respect to particular application. As an example, delay of less than several seconds, or less than 1.0, 0.25, 0.10 seconds, or another time between an event and communication of such event to another computer user may be considered live for purposes of embodiments of the present invention.

In a videoconference, for example, multiple participants may be sending and receiving live real-time video and audio data to one another—each talking to one or more of the others in real-time with delay at a suitably minimal level so that "conversations" between users over the network can take place in real-time. It will therefore be appreciated that the terms "live" or "real-time" when used in this context are not limited to zero delay, but instead indicate that some minimal delay is allowed, which may be, for example, on the order of several seconds. The delay should not be so great as to cause difficulties in different users communicating with one another—delays greater than about 5 seconds may be unsuitable in many applications.

In many videoconferences or other real-time collaboration events, all of Users A-F may see and hear all others of Users A-F by simultaneously communicating streaming audio and video data streams to all others of the Users A-F. Communications between each of the users A-F may be carried out on a two-way basis from the network 10, with data sent to and received from each of the Users A-F over communication lines 14. The communications lines 14, may include physically wired connections, such as copper wires, optical fiber cables, or the like, wireless connections, or a suitably linked combination of wired and wireless connections. Real-time video, audio, and other data may be communicated from each of the users A-F through the server 12 and over communication lines 14. A firewall 16 and/or other security device may isolate Users A-F from the network 10. The firewall 16 has been illustrated in FIG. 1 as located on the communication lines 14. This has been done for illustrative purposes only; the firewall 16 may be at any desired location useful to monitor and control access of traffic between one of the Users A-F and the network 10.

Those knowledgeable in the art will appreciate that communications over the network 10 between Users A-F may be carried out in and number of generally known procedures. For example, known methods of one or more of unicast, multicast, and broadcast communications may be used.

Also, the data may be streaming. In a streaming video communications session application, each user A-F may have one or more cameras, telephones, and/or microphones (or other audio and/or video input devices) from each of which is streamed a continuous, real-time data stream on a particular multicast address and port number. As used herein, the term "continuous" when used in this context is intended to broadly refer to a data stream sent in substantially continuous succession, although some degree of intermittency is contemplated. For example, a packetized data stream in IP may be continuous and streaming even though there may be some delay between discrete packets. The network 10 preferably supports RTP (real time protocol) for communicating real time and streaming data. Additionally, the network 10 preferably uses RTCP (real time control protocol) for communicating statistical information such as, but not limited to, quality of service information regarding a corresponding RTP connection. It will be appreciated that when used in this context, the term "communicate" is intended to be broadly interpreted and does not require direct communication. For example, a first User A may communicate data to a second User B, even though the data passes through a number of intermediate nodes between origination and its final destination.

Figure 2:
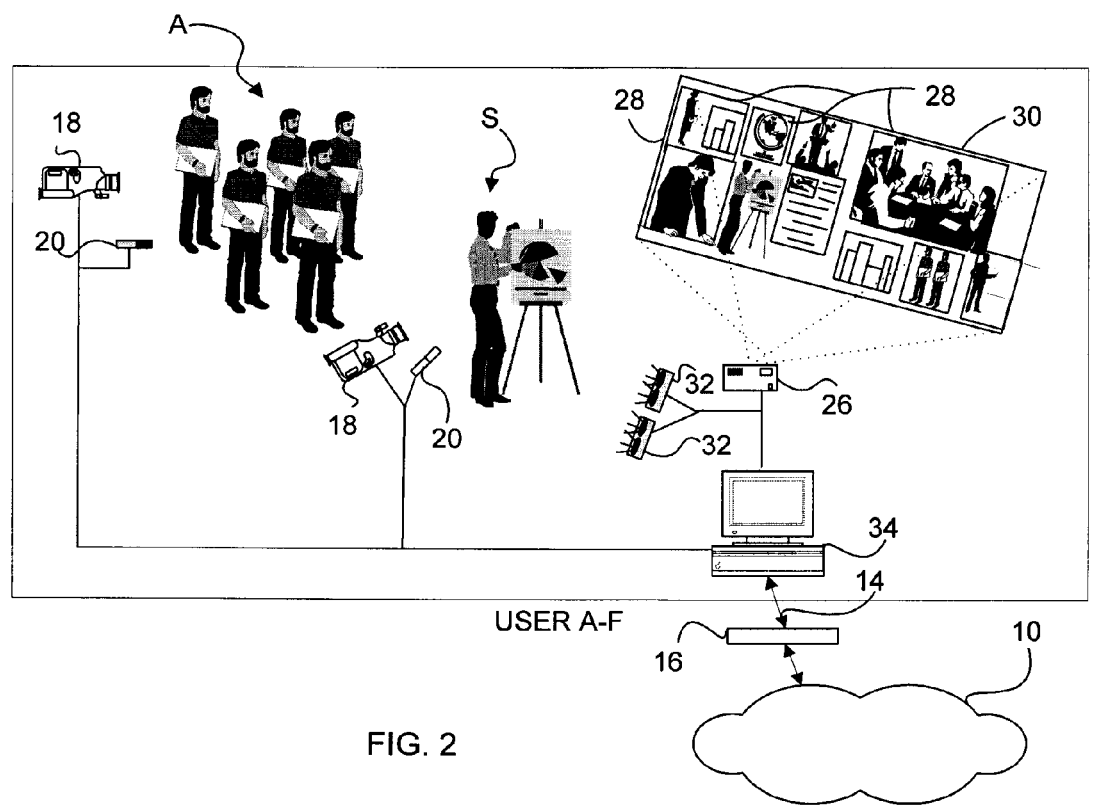
FIG. 2 is a schematic of one example video conference attendee room useful to illustrate practice of some embodiments.
Figure 3:
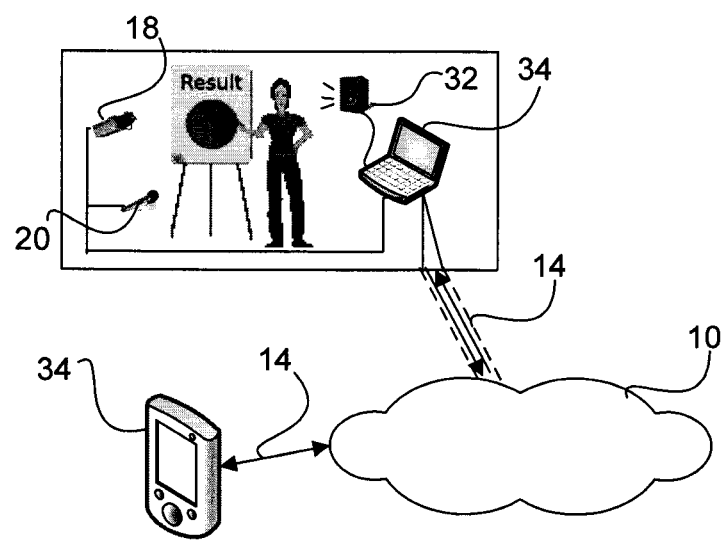
FIG. 3 is a schematic of a second example video conference attendee room useful to illustrate practice of some embodiments.

Communications of the streaming data between Users A-F may be further appreciated through consideration of FIGS. 2-3, which schematically show some representative configurations of the Users A-F. As shown by FIGS. 2-3, the Users A-F may be conference rooms, class rooms, or other spaces in which multiple individuals gather to participate in the video communications session with other individuals that are located at others of the Users A-F. FIG. 3 illustrates an alternate configuration in which a single individual is participating in the conference from, for example, a vehicle (such as an auto, truck, train, plane, boat, etc.), a home office, a hotel room, or other location. Each of the Users A-F can use one or more cameras 18, which are directed at an audience A, an instructor S, or other things or people. In FIG. 3, only an audience A is present (which may be only one individual—or may be more).

Many different cameras will be appropriate for practice of example embodiments, with suitable examples including those available from LOGITECH Co., Fremont Calif. (e.g., Logitech QuickCam Pro 4000), the MICROSOFT LifeCam VX-1000, the SONY EVI D100 series, the CANON VC series of remote pan/tilt cameras, and the like. Many portable devices such as cellular and other wireless phones, personal digital assistants, portable electronic devices, and laptop computers are commercially provided with cameras 18 built in. By way of example and limitation, some embodiments of the invention will find great utility when used with wireless phones that include a video display (and some of which have a built in camera), with particular examples including but not limited to the iPhone from APPLE Computers (including the 3G s); the Blackberry from Research in Motion (including models such as the Bold 9700); the Droid from Motorola; the Pre from Palm Computing; the Behold II, Memoir, Instinct HD or Omnia II from Samsung; the Cyber-shot C905 or Aion from Sony Ericsson; and the like.

With reference to FIG. 2, the cameras 18 at one User A-F may be trained on different people or things at that location, with an example being one camera 18 aimed at an audience A and one camera 18 aimed at a speaker S. The cameras may be controllable remotely, so that User A may be able to direct the direction of a camera 18 at User B, for instance. At other locations, with examples shown in FIG. 3, only one camera 18 is present.

In FIG. 2, two microphones 20 are provided—one for receiving audio from the instructor S and a second for receiving audio from the audience A. However, it is contemplated that more or fewer microphones may be provided. There are a wide variety of suitable microphones available for practice of embodiments of the system, including by way of example SONY ECM microphones, PHOENIX Duet microphones, POLYCOM microphones, and the like. Some computers 34 including mobile devices such as the phones listed above may have a microphone built in. Although not illustrated, those knowledgeable in the art will appreciate that other cameras, microphones, computers, gateways, firewalls, mixers, multiplexers, and like devices may also be present depending on desired video communications session details and other factors.

With reference to FIG. 3, only a single camera 18 is provided and a single microphone 20 along with a computer 34. The computer 34 may be a portable computer, such as a laptop as shown in FIG. 3, or another small form factor device. For example, computer 34 may be any other portable processor-based computing device. For example, a personal digital assistant (PDA), a cellular telephone, or the like may be used as the computer 34. This might be useful for allowing an individual to participate in a video communications session from a home office, while traveling in a hotel room, on a plane, in a car or the like. The camera 18 (such as a LOGITECH QuickCam) and microphone 20 might be combined on a laptop mountable unit, for instance, and the speaker 32 (and an alternate microphone 20) might be headphones worn by the user. Suitable headphones include those available from PLANTRONICS Corp. This example configuration is particularly convenient for portable participation in video communications sessions. Alternatively, the camera, speaker, and/or microphone may be built into the computer 34.

Additionally, it is contemplated that one or more of the Users A-F may be "view-only users." These users include a computer 34 such as a laptop computer, a cellular telephone, a PDA, or other small form factor device. As the name suggests, view-only users are able to view the various audio and/or video streams that makes up the video conference, but do not provide a video stream. Such users may provide an audio stream. Such an arrangement is useful for users that have limited bandwidth available. For example, users connecting through a cellular network may be unable to upload a sufficient amount of data to provide a video stream to video conference attendees. In some other mobile applications, however, a user may use a computer such as an iPhone with a built in camera that transmits video of their face as they view their phone's display.

In an example video communications session such as a videoconference, each of the Users A-F not only sends streaming video and audio data, but likewise receives streaming video, audio, and other data communicated from some or all of the other Users A-F. In some applications, all video streams are sent and received by users in discrete, single, un-bundled streams, while discrete audio streams may be bundled at bridge 12 or other location and then communicated to individual users in a bundled form. Referring once again to the schematics of FIGS. 2-4 by way of example, one or more displays 26 may be provided to display real-time video images 28 from one or more of the other Users A-F.

Figure 4:
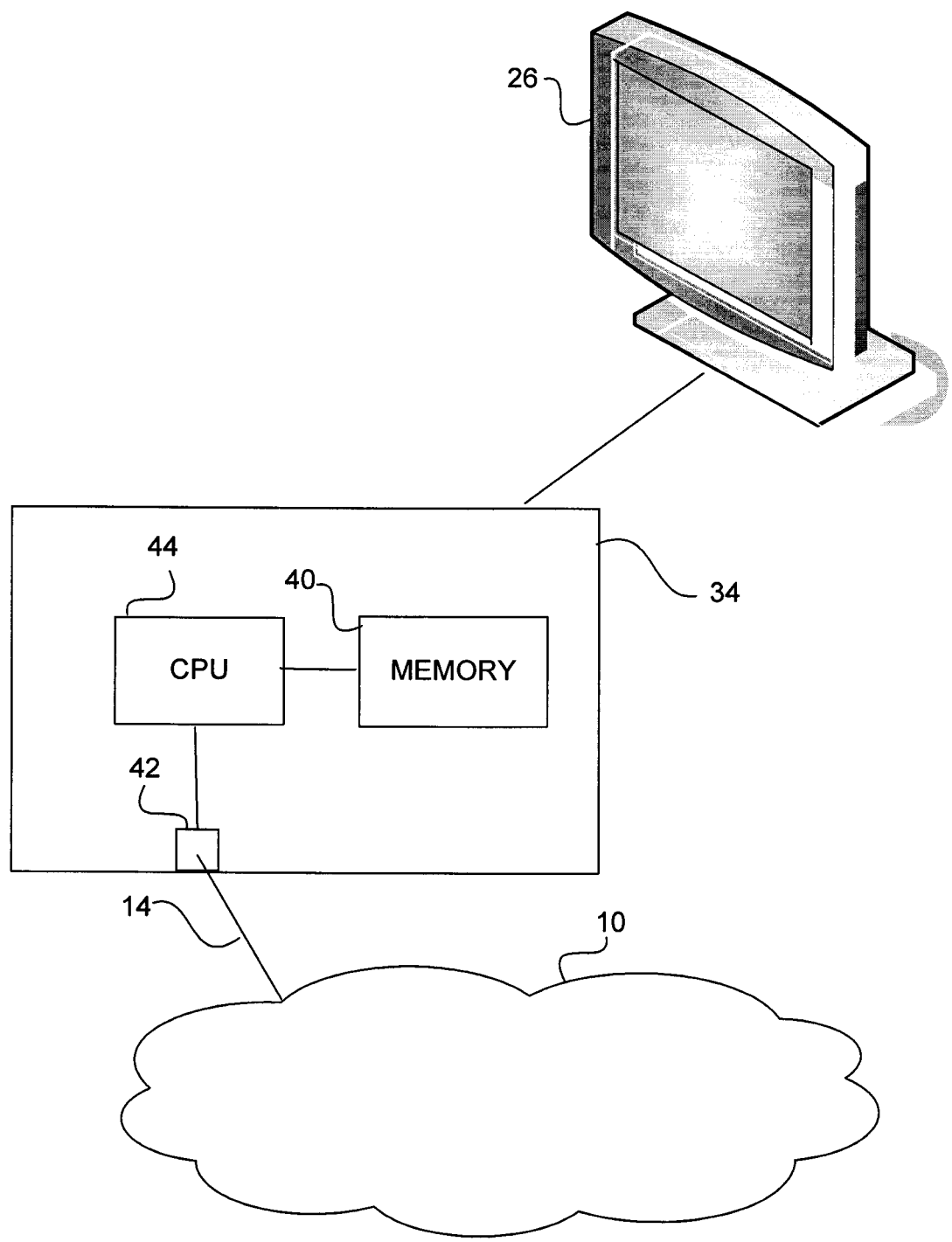
FIG. 4 is a schematic diagram of a computer present in the example video conference rooms shown in FIGS. 2 and 3.

The display 26 may be, for example, a projector used to project real-time video images 28 onto a screen 30, as shown in FIGS. 2-3. There are a variety of suitable projectors widely commercially available, with examples including those from INFOCUS Co. such as its LP series, TOSHIBA TDP series, NEC MT series, SHARP PG series, and IBM projectors. The projectors may have specification as are appropriate for a particular application, with an example being having at least 2000 lumens and XGA resolution. Also, it will be appreciated that use of a projector to display output images may easily be replaced with use of a monitor or other suitable video output device on which output video images (2D or 3D) are viewed. For example, FIG. 3 illustrates a laptop computer 34, the monitor of which may be useful to display output video data streams 28 from others of the Users A-F. Other, larger size monitors may also be used as the display 26 to display video data as shown in FIG. 4, with examples including standard cathode ray tube (CRT) monitors, 19", 40", 50" and larger plasma, LCD, DLP and other technology monitors. One or more speakers 32 or other audio output devices may also be provided to play real-time audio from the other users or other sources. Portable devices such as the phones listed above include a display 26 built in for displaying video.

Any number of video images may be provided that show video data in real time from any number of other cameras or other sources located at the other Users. For example, User A may simultaneously display output video data streams 28 from each of the other Users B-F, or may choose to display a select subset of those streams. The display of streams may be set as desired, with different output display streams 28 located in different locations on the display 30. Further, the output video streams 28 may include charts, graphs, documents, other digital files, replayed video files, and the like.

As shown in FIG. 4, one or more computers 34 at each of the Users A-F may be used to receive and send all of the video, audio, documents, digital files and other data at the standard User A. The computer 34 may be referred to as a client computer or client, although as noted above it may also function at times as a server with the computer 12 being a client. A variety of computers that are currently commercially available will be suitable for use as computer 34, with nonlimiting examples including the Dell Precision 470 with dual processors and the HP Workstation XW6000 dual processor.

Each of the computers 34 further includes at least one memory 40, such as a RAM, a flash memory, a hard disk drive, an optical drive, or the like. Some memories 40 may be volatile while others are non-volatile. A variety of commercially available memory devices for a computer will be suitable for use as the memory 40, with nonlimiting examples including the Crucial CT820211 or CT850340 memory kits, the Seagate ST32000641AS hard disk drive, or the Sony Optiarc AD-72405-0B DVD drive. The memory 40 stores the video codec necessary to encode/decode video streams and a video stream ID table which stores video stream ID values, along with information indicating whether or not a decode information set has been received for the video stream ID. Additionally, if a decode information set has been received for a particular video stream ID, the video stream ID table may also store the most recently received decode information set. The memory 40 also stores one or more program products for communicating the encoded video streams to other users.

The memory 40 may store one or more, for example, of a videoconference client program product of the invention that causes the computer 34 to execute the basic operations of videoconferencing, including communicating and receiving a video data stream to and from each of the other user computers 34 over the one or more bridges 12, a video encoding computer program product of the invention that causes the user computer to encode video data received from the camera 18 using one or more encoding parameters, a decode information set request monitoring program (with functionality as explained below), a decode information set detection program product (with functionality again explained below), codecs and the like. These program products may be stand alone programs, may be packaged into a single program product, may be functional sub-programs used by a master program, and may take other functional arrangements.

The computer 34 further includes a plurality of ports 42, which provide a communication interface allowing the computer 34 to both transmit data to one or more of the other Users A-F and to receive data from the other Users. The ports 42 can include one or more physical ports, each physical port being capable of providing one or more of virtual ports. Thus, while FIG. 4 shows one physical port 42, it is understood that additional physical ports may be added to the computer 34 without departing from the spirit of the present invention. Ports 42 are connected, for example, to the network 10 via the communication lines 14

One or more processors 44 is used to control the computer 34, executing the programs stored in the memory 40 and controlling the communications interface of the ports 42. In this context, the processor 44 should be broadly understood to indicate one or more electronic circuits that are used to execute instructions or perform actions as directed by programs. A variety of commercially available processors will be suitable for use as the processor 44, with a nonlimiting example being the Intel Xeon 2.8 GHz processor.

As explained above (and as with the computer 12), the computer 34 is intended to be broadly interpreted and is not limited to a single, desktop type computer as illustrated. Other devices that include a processor capable of executing instructions may be used, although they may sometimes be referred to as a device other than a "computer." Accordingly, the term "computer" as used herein with reference to computer 34 (and computer/server 12) is intended to be broadly interpreted. Examples include, but are not limited to, media communications devices having a processor, communications devices such as processor enabled phones or personal digital assistants, processor based gaming devices, and the like. Further, the computer 34 may be comprised of two or more computers linked to one another.

An application program or programs may include one or more software components for linking communication and facilitating communication of data between the Users A-F. A "software component" or "component" as used herein is intended to broadly refer to a set or sets of executable instructions (as nonlimiting examples, executable software modules or nodes) that allows a computer to perform all or part of a function or group of functions for linking communications between users.

For example, software components, including one or more codecs, may be running on the computer 34 to provide signal encoding/decoding, compression/decompression, to coordinate receiving and sending of the data streams, and/or to control other aspects of sending and receiving of the data streams. The codec may use various parameters to encode the video stream received from the camera, with example parameters including one or more of bit rate, frame size, frame resolution, frame rate (or frequency), frame height, frame width, brightness, contrast, saturation, whiteness, sharpness, quality, communications port, protocol (e.g., H.264), and the like.

Further, as explained above the computer program products running on the computer 34 may be configured as separate functional sub-programs or program products. As an example, in some invention embodiments, a videoconference client program may operate that includes instructions for controlling many aspects of participating in a videoconference. The videoconference client program may include the encoding and/or decoding program product, or this may be configured as a separate program product. Further aspects of the invention as will be explained below may include a decode information set request monitoring program product, and/or a decode information set detection program product that are running on the computer 34. These program products may be stand-alone program products, or may be part of a videoconference client program product.

As another example, the computer 34 may be used to control which or how many video images 28 are displayed on the screen 30, to size the images 28, to set audio levels for the speakers 32, and the like. Each computer 34 may be running software components, such as but not limited to a video codec, an audio codec, other codecs, one or more application programs, and/or other programs. These may be combined into a single application program or may be separate from one another. The computer 34 may also have video and audio capture cards, with an example being WEBCAM Corp. 4 input video capture card.

One nonlimiting example of a video codec used for encoding/decoding and compressing/decompressing video as described above is a codec adhering to the H.264 standard developed by the International Telecommunications Union Video Coding Experts Group. The present invention is of course not limited to any particular codec or video encoding standard, and indeed embodiments of the invention will find utility when used with a wide variety of codecs and encoding/decoding standards, some of which do not presently exist, are not foreseeable, but are sure to be introduced in the future. Other examples of currently known video codecs that could be used include MPEG-2, Panasonic's DVCPRO50, DVCPROHD, HDD5, Sony's HDCAM-SR, Apple Computer's Prores HQ 422, Huffyuv for Win32 and published under the GPL, DivX Pro (MPEG-4 ASP) by DivX, Inc., FFmpeg (MPEG-4) (included in open source libraries from Mplayer, VLC, and others), 3ivx (MPEG-4) from 3ivx Technologies; x264 (a GPL-licensed implementation of the H.264 encoding standard), Nero Digital (MPEG-4 ASP and AVC) from Nero AG; WMV (Windows Media Video including WMV 7, WMV 8, and WMV 9) available from Microsoft Corp., VP6/VP6-E/VP6-S/VP7 from On2 Technologies; libtheora from Xiph.org Foundation; Schrödinger and dirac-research available from BBC Research at the BBC; DNxHD available from Avid Technology; Sorenson 3/Sorenson Spark; and the like.

The encoded video can be decoded or otherwise processed using a decode information set. The decode information set may include one or more of bit rate, frame size, frame resolution, frame rate (or frequency), frame height, frame width, brightness, contrast, saturation, whiteness, sharpness, quality setting, communications port, protocol (e.g., H.264), protocol identification, common codec parameters or variables that are used by any of the above listed codecs, frame width and height, bit depth of the encoded video, the number of reference frames to use during a decode process, maximum X and Y motion vector distances, as well as other information useful to decode and/or process the video data. In some but not all embodiments, a decode information set may be configured as a key frame.

In some but not all embodiments, the decode information set and/or key frame may include or may be an instantaneous decoder refresh (IDR) frame that an encoder provides to a decoder. The IDR frame is a specific type of key frame that causes a decoder to invalidate other frames that have been buffered, and which serves as a reference for all subsequent frames to be decoded. In some applications, an IDR is used as a "base frame" for a series of subsequent frames. Changes from the base or IDR frame are mapped in the subsequent frames. This can achieve efficiency over communicating the entire frame for each frame (only changes as compared to the base or IDR frame need be communicated). Additionally, the decode information set may include information regarding a change in packetization mode of video stream data, adjustments to the encoding profile, frame rate, and bit rate of the encoded video stream.

The decode information set may include a fully specified static image, as well as parameter information such as a sequence parameter set and a picture parameter set. The sequence parameter set includes parameter information that remains unchanged throughout the encoded video sequence including, but not limited to, frame width and height, video bit depth, a number of reference frames to be used during decode, and maximum motion vector distances in the x- and y-directions. Other information may likewise be included in the decode information set. The parameter information and/or static image and/or key frame and/or corresponding video stream ID and/or other information that make up all or part of the decode information set can be used as a translation table for decoding or otherwise processing the video stream data. The translation table may be stored in the memory 40 or other location for future reference. In addition to the decode information set, encoded videos may include one or more of intra-coded frames (I-frames), predicted frames (P-frames), and bi-directional predicted frames (B-frames). I-frames include image data in the form of a fully-specified static image. That is, each I-frame specifies information for each pixel in the video frame. In contrast, P-frames and B-frames specify only data indicating differences between the frame and one or more previous and/or subsequent frames. Efficiencies can be achieved by communicating relatively large I-frames and/or decode information set (such as a static image or an IDR) only once in a provided period, but then communicating much smaller P-frames and/or B-frames for the remainder of the period to specify changes from frame to frame.

According to the configurations of FIGS. 1-3, a communications session such as a videoconference or other virtual meeting can occur between two or more of the Users A-F. The Users A-F may virtually "attend" an immersive and extensive virtual meeting that includes audio, video and/or other streaming data shared in real-time. Participants at each of the Users A-F may simultaneously hear and/or view data from all others of the Users A-F. At least the streaming video data may be communicated to each user from all others of the Users A-F using Real Time Protocol, such that an RTP connection exists between each pair of users participating in the videoconference as discussed above. As used herein, the term "connection" denotes a sustained data communication from one port of a user to a corresponding port of another user. Connections are established so that each of the other Users A-F that is transmitting video is connected with the user through an RTP connection at a different port. RTP communication provides information such as timestamps for synchronization, sequence numbers for packet loss detection, and a payload format for indicating the encoded format of payload data.

Additionally, each RTP connection has a corresponding RTCP connection. While an RTP connection is typically assigned an even-numbered port when connecting to the computer 34, the corresponding RTCP connection is preferably assigned the next subsequent odd-numbered port. While these port assignment conventions match industry standards, port numbers can be assigned in any manner a user desires without departing from the scope of the present invention. The RTCP connection is used to monitor transmission statistics and quality of service (QoS) information. The gathered QoS information may include data such as transmitted octet and packet counts, lost packet counts, jitter, and round-trip delay time. As discussed above, a user receives a decode information set from all other Users A-F in order to decode the particular streaming video data stream that originates from each particular user. Before a decode information set is received, the user is unable to decode received video stream data, and is thus unable to view streaming video from other locations. Accordingly, it has been discovered that significant advantages and benefits can be achieved by allowing for provision of a decode information set using embodiments of the present invention.

To provide a decode information set to a user within a relatively short delay time (and in some embodiments substantially instantaneously), some embodiments of the invention exploit an RTCP connection in a previously unknown manner to communicate a decode information set request message indicating that a user needs a decode information set to decode a particular video stream. The decode information set request message includes at least a video stream ID of the video stream for which the computer 34 is requesting a key frame, and a request or command instructing the originator of the video stream data identified by the video stream ID to create and transmit a decode information set. Additionally, because there is an existing RTCP connection corresponding to each RTP connection that a user receives, it has been discovered that the existing RTCP connections may be exploited in a novel manner to communicate the message to each of the other users transmitting video to the requesting user. The message is communicated from the requesting user to the video stream originators via the established RTCP connections.

That is, in these example embodiments the RTCP connections serve as a back channel allowing the message to be communicated to stream originators via a broadcast or multicast communication. In this way, embodiments of the invention use RTCP connections as a back channel to provide commands to the originators of each video stream that a user is receiving. This provides numerous benefits and advantages. For example, the RTCP back channel may exist over a different port than the RTP communications. This port may be less congested and more readily monitored for fast response.

While embodiments of the present invention utilizes RTP and RTCP protocols, those of skill in the art will understand that other protocols may be used without departing from the scope of the present invention. In many example embodiments, paired protocols are used that include a transport protocol and a paired control protocol.

Figure 5:
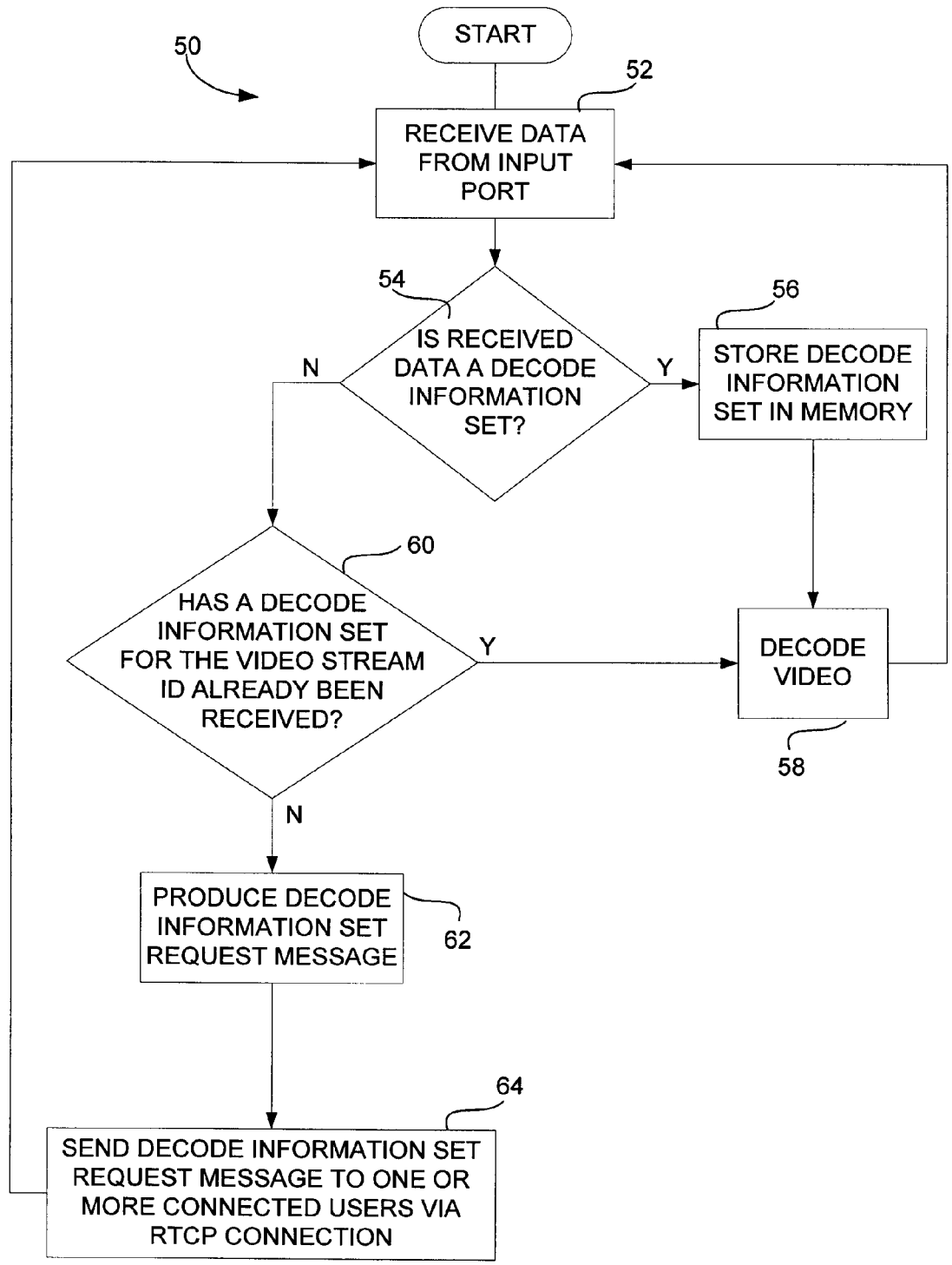
FIG. 5 is a flowchart illustrating a method of decoding video according to embodiments of the present invention.

Aspects of example embodiments of the invention may be further illustrated by considering a video encoding/decoding process. A video decoding process 50 is described with reference to FIG. 5. Once a user uses the computer 34 to connect to the network 10 and requests to participate in a video conference, the user computer 34 receives one or more video streams via the ports 42 in step 52.

After the user receives video stream data for the one or more video streams, the video data is sent to the processor 44 for decoding. When video data from a particular video stream reaches the processor 44, the processor executes a decode information set detection program (which may be stored on a local memory) to determine whether or not the received data is a decode information set for the video codec in step 54. This may be determined, for example, by a Boolean flag value established in the received data. Alternatively, because the decode information set data is relatively large compared to other frames, the processor may determine that received data is a decode information set based on the size of the received frame data. Many other steps are possible for determining that data is a decode information set.

If the received video stream data is a decode information set (YES in step 54), the decoder determines the video stream ID for which the decode information set corresponds to, and stores the decode information set and associated video stream ID in memory at step 56. The decode information set may include a video stream ID indicating which video stream it corresponds to. Subsequently, the video data is decoded using the parameters specified in the received decode information set in step 58, and the process returns to step 52. Step 58 may be performed by, for example, a codec or decoding program.

Alternatively, if the received video stream data is not a decode information set (NO in step 54), the decode information set detection program determines the video stream ID of the received video stream data, and determines whether or not a decode information set associated with the video stream ID is already stored in memory in step 60 by consulting the video stream ID table in the memory 40. The video stream ID may be a unique value indicating the originating computer 34 or camera 18 of the video stream data, the originating user, or some other unique identifier that has been assigned to the particular video stream. It may be automatically assigned by the encoder, set according to a user's preferences, or established in another manner. Alternatively, the video stream ID may be assigned at the time a video stream packet is transmitted to other users. For example, the video stream ID may be assigned by a network interface card connected to the computer 34. The video stream ID may be included in each video data packet header.

If a decode information set associated with the video stream ID has been received (YES in step 60), the video stream data is decoded, decompressed or otherwise processed using the parameters specified in the decode information set in step 58. The particular steps of decoding, decompressing, or other processing the video data stream will vary with different invention embodiments, and with, for example, what particular parameters are stored in the decode information set, the particular codec being used, and other variables that depend on a particular application.

In some embodiments, when decoding a video stream the processor begins with a decode information set including a fully-specified frame. In these invention embodiments, the decode information set contains a fully specified image and parameter sets specifying, for example, one or more of video resolution, size, and type, frame height, frame width, frame frequency, frame width and height, bit depth of the encoded video, the number of reference frames to use during a decode process, maximum X and Y motion vector distances, and the like and as discussed previously. In this way, the decode information set can be used to essentially reset a video stream and initialize the decoder. This initialization process allows a user to begin receiving video stream data at the start of a videoconference, and/or to correct errors encountered during a video conference, for example as a result of gaps in the video stream data due to packet loss.

In embodiments in which the decode information set includes a fully specified image, the fully specified image can be added to a frame buffer to be displayed on a user's display. Decoding a subsequent frame uses the fully-specified image of the decode information set as a base, and makes changes specified by the data received for the subsequent frame to fully specify the subsequent frame. The subsequent frame is analyzed, and for portions of the frame which have not been changed with respect to the image contained in the decode information set, data is copied from the fully-specified image to the subsequent frame bit by bit. If portions of the subsequent frame have changed in a simple manner, the decoder is used to, for example, shift, rotate, lighten, or darken elements from the fully specified image as necessary. Where more complex changes are made to the subsequent frame relative to the image contained in the decode information set, the new frame data is specified in the subsequent frame. In this way, all portions of the subsequent frame are specified, and the decoded and decompressed frame can be added to the frame buffer to be displayed.

On the other hand, if the memory does not contain a decode information set associated with the video stream ID, the video codec generates a decode information set request message specifying the video stream ID of the streaming video data for which there is no stored decode information set and containing a request or instructions for causing the originator of the stream to generate a decode information set for the stream in step 62. The generated decode information set request message may be an error message resulting from the inability to decode the video stream data, or an application-specific message. Additionally, the generated decode information set request message may include a string identifier that identifies messages that provide commands to a video encoder. In some embodiments, the content of the decode information set request message is not dependent upon the protocol used to communicate the message to the stream originator. Instead, the message content can be interpreted by the encoder of the stream originator once it is received.

The processor then directs the generated decode information set request message to one or more ports for communicating the message to the other users using the established RTCP connections in step 64. In some embodiments, at regular intervals the processor determines whether there are any messages to be sent via the RTCP connection. The regular intervals may be set as desired, with one example being about every two seconds, but the interval time may be shorter or longer, as desired by a user. In some embodiments the interval may be set so small that continuous monitoring may be achieved to result in substantially instantaneous response.

Some invention embodiments address situations in which some, but not all, of the decode information set are missing. If only one or a few of the full set of decode information parameters are missing, some invention embodiments will send a request for only those parameters. The missing parameter will be identified in the request. This can achieve efficiencies in the amount of data communicated between requestor and sender.

In some embodiments, the decode information set request message is communicated from the requesting user to each of the other users from which the user receives video stream data. The message may be communicated to a server 12 that forwards the message to each of the other users, or the message may be communicated to the other users directly. Alternatively, the generated message may be provided, either directly or indirectly through a server 12, to a subset of the other users. For example, the decode information set request message could be provided to only other users providing video streams for which a decode information set has not been received, or only to a single other user providing a video stream specified by the video stream ID in the generated message. In some embodiments, the decode information set request includes the ID of one or more video data streams for which no decode information set is available. In other embodiments, the request may be sent without any stream ID contained therein.

The generated message is sent to the one or more other users relatively rapidly. Transit time for the request message depends on multiple factors including network latency, topography, network resources, and other factors. In many applications, it is typically on the order of about 100 milliseconds, but again will vary based the network components that exist between users. For example, improvement in transfer speeds of network data would significantly reduce the transit time of the request message, and in some embodiments of the invention transit time will approach a speed sufficient to achieve substantially instantaneous transit.

In some embodiments, the decode information request message is configured as an error message supported by the particular control or other protocol it is formatted in. As an example, it may be configured as an RTCP error message. This has particular advantages and benefits. For example, it provides for some degree of "built in" capacity to create, communicate and respond to the request. Protocols such as RTCP have an established support structure for processing error messages. Also, in some protocols error messages are treated with priority in communication, transit, reception, processing, and response. This can lead to significantly reduced delay in the start to finish processing of the request.

Once the request message has been transmitted to the other user(s), the process returns to step 52 as the computer 34 waits to receive a decode information set from the originator of the video stream data. Typically, the decode information set is received from the originator of the video stream data relatively rapidly (again, in some applications on the order of 100 milliseconds, although faster transit times are achieved in some embodiments), so that the decoder is able to decode and process video stream data and provide video to a display device within a time period less than 1-2 seconds, often less than 0.5 seconds, and in some embodiments substantially instantaneously.

Figure 6:
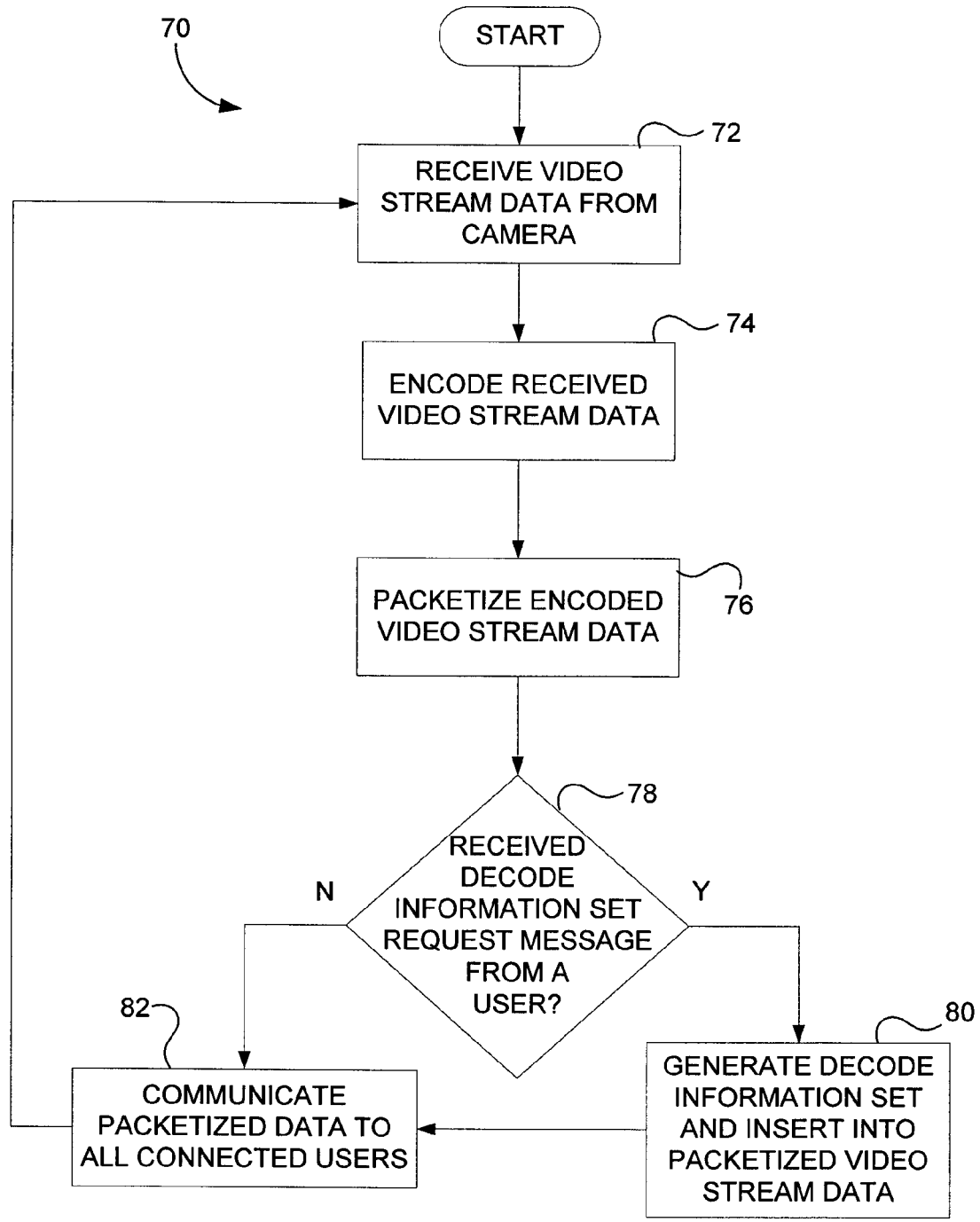
FIG. 6 is a flowchart illustrating a method of encoding video according to embodiments of the present invention.

An encoder may produce a decode information set (with an example being a key frame) for an encoded video stream at the start of generation of the video stream and at regular intervals thereafter, as well as when configuration changes are made to the encoded video stream. An encoder according to an embodiment of the present invention produces a decode information set in all of the above circumstances, but also produces a decode information set in response to a decode information set request message. FIG. 6 shows a video encoding process 70, where the encoder receives a decode information set request message. A computer 34 receives video data from a camera 18 in step 72. Then, a video encoding computer program executed by the processor 44 encodes the video data using the video codec in step 74.

In step 76, the encoded data is divided into packets based on RTP. Alternatively, the packets may be formatted for any transport protocol that allows for ordering of packets that is sufficient to transmit streaming video. As discussed above, paired protocols such as RTP and RTCP are used in some invention embodiments, but this is not necessary. The data packets are then prepared for delivery to all other users participating in the video conference. As the data is packetized, the unique video stream ID is included in the packet header, according to RTP standards as detailed in RFC 3550. When using alternate protocols, the video stream ID is preferably still inserted into the packet header. However, if the chosen protocol is unable to accommodate the video stream ID in the header, the video stream ID may be inserted into packet payload data, for example as the first or last data item in the payload data.

During the encoding and packetizing steps, in some invention embodiments a decode information set request monitoring program stored in a memory of the encoding computer "listens" or monitors RTCP connections to check for incoming messages instructing the encoder to generate a decode information set for a video stream ID for which the user is the originator. The monitoring process may be completed by polling the RTCP connection at predetermined intervals that may be selected depending on available resources and needs. In some applications it may be a range of several milliseconds or less, several microseconds or less, and in some not exceeding about one second to check for received decode information request messages, as shown in step 78 of FIG. 6. In some embodiments there may be no interval, but instead the monitoring may be substantially continuous to achieve substantially instantaneous response.

Alternatively, the monitoring process may be performed using interrupt processing techniques. In response to receipt of a decode information set request message containing a video stream ID for which the user is the originator, an interrupt request is generated substantially instantaneously. When the encoder receives the interrupt request, the encoder generates a decode information set at the next encode time. Encode times occur at regular intervals of between about 33 milliseconds and about one second. Use of interrupt processing techniques results in removal of at least part of the delay introduced by polling at predetermined intervals. Moreover, the use of interrupt processing eliminates the unnecessary steps of checking for a received message when there have been no communications, thus reducing the processing burden of the encoding computer.

Also, in other embodiments where the request is configured as an error message in a particular protocol, the receiving computer that supports that protocol may have a particular procedure for processing error messages in an expedited manner. Such procedures may not require an active monitoring of ports or the network. Reception of the error message may cause a logical flag or other event to occur which triggers substantially immediate response, for example. In response to the originating computer receiving a decode information set request message instructing the encoder to create a decode information set (YES in step 78), the originating computer creates a decode information set using coding parameters. In some other embodiments, the decode information set is pre-existing and stored in a memory, and may be retrieved from the memory as opposed to being newly created.

As explained above, the particular parameters will vary with different invention embodiments and applications. In some embodiments, video stream information received from a camera connected to the encoding computer as well as encoding parameters for the video stream data, including frame width and height, bit depth of the encoded video, the number of reference frames to use during a decode process, maximum X and Y motion vector distances, and the like, are placed in the decode information set. The generated decode information set is inserted into a network send buffer as part of the encoded video stream data to be communicated to all other users in step 80. Alternatively, the decode information set may be communicated only to the user that transmitted the decode information set request. This advantageously reduces the number of decode information sets that the originating computer sends, since each other user need only request a decode information set when joining a videoconference, and/or when a portion of the video stream data is lost.

Moreover, sending decode information sets in response to error messages from users advantageously reduces the average-case delay between a user joining a video conference and that user being able to decode the video. That is, while a user typically may wait for periods of up to 5, 10 or 20 seconds to receive a key frame and begin decoding (and thus viewing) video using conventional video conferencing software, the embodiments of the present invention allow a user to receive a decode information set for decoding streaming video relatively faster (e.g., on the order of one second). This change improves user perception and overall satisfaction with provided video conferencing services.

Following step 80, or if the computer has not received an error message (NO in step 78), the encoded video stream data is transmitted from the network send buffer of the encoding computer to one or more other videoconference attendees in step 82. The communication to other uses may be, for example, via broadcast or multicast communication. Following communication of the encoded and packetized video stream data, the process returns to step 72.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A videoconference system comprising:
   a plurality of computers associated with the system, the plurality of computers to collectively send and receive one or more video data streams among the plurality of computers;
   a video encoding computer program product comprising executable instructions stored in a non-volatile computer-readable medium, the video encoding computer program product executable by at least a first of the plurality of computers and, when executed, causing the executing computer to encode video data using one or more encoding parameters; and
   a decode information set request monitoring program product comprising executable instructions stored in a non-volatile computer-readable medium and executable by at least the first of the plurality of computers, and causing the first computer to perform the steps of:
      monitoring a network for reception of a decode information set request message; and
      responding to the decode information set request message by querying the decode information set request message for an ID, and if the ID of the decode information set request message corresponds to a video data stream generated from the first computer, communicating the corresponding decode information set that includes the at least one encoding parameter to at least a second computer that transmitted the decode information set request message.

2. The videoconference system of claim 1, wherein a videoconference client program communicates video data using a first protocol, and wherein the decode information set request message is in a second protocol.

3. The videoconference system of claim 2, wherein the first protocol is a transport protocol for communicating at least video data over the network, and the second protocol is a control protocol for communicating control parameters.

4. The videoconference system of claim 3 wherein the control protocol is configured to support communication of error messages wherein the first computer responds to error messages substantially instantaneously, and wherein the decode information set request message is configured as an error message.

5. The videoconference system of claim 1, and further comprising a decode information set detection program product that includes executable instructions stored on a non-volatile computer-readable medium executable by at least a second of the plurality of computers and, when executed, causes the second computer to perform steps of:
   querying a first incoming video data stream for a stream ID;
   communicating a decode information set request message including at least the first video stream ID to at least the first computer;
   receiving the corresponding decode information set communicated from the first computer; and,
   using the decode information set to process the first video data stream, and then displaying the first video data stream on a display.

6. The videoconference system of claim 5 wherein the second computer communicates a single decode information set request to a first selected set of the plurality of computers that have each communicated a video stream for which no decode information set is available, and wherein the decode information set request is not communicated to a second selected set of the plurality of computers that have communicated streams for which a decode information set is already available.

7. The videoconference system of claim 5 wherein the decode information set detection program product carries out the steps of:
   determining that no decode information set is stored in a memory for the first incoming video data stream; and,
   wherein the step of communicating the decode information set request message is only performed if no decode information set is stored in the memory.

8. The videoconference system of claim 1, wherein at least one of the plurality of computers is a mobile device.

9. The videoconference system of claim 1, wherein the one or more encoding parameters are selected from the group consisting of frame width, frame height, video bit depth, number of reference frames used during the decode, x-direction maximum motion vector distance, and y-direction maximum motion vector distance.

10. The videoconference system of claim 1, further comprising a decode information set detection program product stored in a non-volatile computer-readable medium executable by at least a second of the plurality of computers and, when executed, causes the second computer to perform steps of:
   determining that no decode information set is stored in a memory for a first of the one or more video data streams;
   querying the first video data stream for a stream ID;
   communicating a decode information set request message including at least the first video stream ID to at least the first computer;
   receiving the decode information set from the first computer, storing the received decode information set in a memory, and using the received decode information set to decode the first video data stream.

11. A videoconference client comprising:
   at least one communications port configured for receiving at least one video data stream, the video data stream including at least a stream ID and video data encoded using one or more encoding parameters;
   a non-transitory computer readable medium for storing, for each of the at least one video data streams the stream ID and the associated one or more encoding parameters;
   a decode information set detection program configured to query the received video data stream for the stream ID, and determine whether a decode information set including the one or more encoding parameters used to encode the video data is stored in the non-transitory computer-readable medium;
   the at least one communications port configured for sending a decode information set request message when it is determined that the one or more encoding parameters associated with the stream ID are not stored in the non-transitory computer readable medium; and
   wherein the videoconference client receives a decode information set including at least the one or more encoding parameters in response to the transmitted decode information set request message.

12. The videoconference client of claim 11, wherein the video data stream is received using a first protocol, and wherein the decode information set request message is transmitted using a second protocol.

13. The videoconference client of claim 12, wherein the first protocol is a transport protocol for communicating at least video data over a network, and the second protocol is a control protocol for communicating control parameters.

14. The videoconference client of claim 13, wherein the control protocol is configured to support communication of error messages, wherein a transmitting computer is configured to respond to error messages substantially instantaneously, and wherein the decode information set request message is configured as an error message.

15. The videoconference client of claim 11, wherein the videoconference client is a portable wireless device that includes a display for displaying video from the video data, and wherein the at least one video data stream and the decode information set are communicated wirelessly.

16. The videoconference client of claim 11, wherein the decode information set detection program causes the videoconference client to perform steps of:
    determining that no decode information set is stored in a memory for a first of the one or more video data streams;
    querying the first video data stream for a stream ID; and
    generating a decode information set request message including the stream ID,
    wherein the step of generating a decode information set request message is only performed if no decode information set is stored in the memory for the first video data stream, and
    wherein a second device transmits the generated decode information set request.

17. A videoconference client as defined by claim 11 wherein the at least one communications port is configured to receive the at least one video data stream over a bridge from a transmitting computer, and wherein the at least one communications port is configured to send the decode information set request message to the transmitting computer.

18. A videoconference client as defined by claim 11 wherein the at least one communications port comprises a first communications port for receiving data and a second port for transmitting data.

19. A portable, wireless videoconference communications device comprising:
    a display configured to display decoded video data;
    at least one wireless communications port configured to receive at least one video data stream from a videoconference transmitting computer using a transport protocol, the video data stream including at least a stream ID and video data encoded using one or more encoding parameters;
    a non-transitory computer readable memory for storing the stream ID and the associated one or more encoding parameters for each of the at least one video data streams;
    a decode information set detection program configured to query the received video data stream for the stream ID and to determine whether a decode information set including the one or more encoding parameters used to encode the video data is stored in the non-transitory computer-readable memory;
    the at least one wireless communications port configured for wirelessly transmitting to the videoconference transmitting computer a decode information set request message using a control protocol when it is determined that the one or more encoding parameters associated with the stream ID are not stored in the non-transitory computer readable memory; and
    wherein the videoconference communications device receives a decode information set including at least the one or more encoding parameters from the videoconference transmitting computer in response to the transmitted decode information set request message and uses the decode information set to decode the video data stream and displays the decoded video data on the display.

* * * * *